US010017651B2

United States Patent
Gu

(10) Patent No.: US 10,017,651 B2
(45) Date of Patent: Jul. 10, 2018

(54) COMPOSITION OF HYDROPHILIC PAINTED SURFACE

(71) Applicant: Empire Technology Development LLC, Wilmington, DE (US)

(72) Inventor: Yansong Gu, Bellevue, WA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 39 days.

(21) Appl. No.: 14/888,386

(22) PCT Filed: May 2, 2013

(86) PCT No.: PCT/US2013/039319
§ 371 (c)(1),
(2) Date: Oct. 30, 2015

(87) PCT Pub. No.: WO2014/178873
PCT Pub. Date: Nov. 6, 2014

(65) Prior Publication Data
US 2016/0075888 A1 Mar. 17, 2016

(51) Int. Cl.
| C09D 5/16 | (2006.01) |
| C09D 5/00 | (2006.01) |
| C09D 101/02 | (2006.01) |
| C09D 105/00 | (2006.01) |
| C09D 105/02 | (2006.01) |
| C09D 105/08 | (2006.01) |
| C09D 133/00 | (2006.01) |
| C09D 7/60 | (2018.01) |
| C09D 7/61 | (2018.01) |
| C09D 7/40 | (2018.01) |
| C08K 3/16 | (2006.01) |
| B82Y 30/00 | (2011.01) |

(52) U.S. Cl.
CPC ............ *C09D 5/1681* (2013.01); *C09D 5/00* (2013.01); *C09D 5/1687* (2013.01); *C09D 7/60* (2018.01); *C09D 7/61* (2018.01); *C09D 7/67* (2018.01); *C09D 7/68* (2018.01); *C09D 7/69* (2018.01); *C09D 101/02* (2013.01); *C09D 105/00* (2013.01); *C09D 105/02* (2013.01); *C09D 105/08* (2013.01); *C09D 133/00* (2013.01); *B82Y 30/00* (2013.01); *C08K 3/16* (2013.01)

(58) Field of Classification Search
None
See application file for complete search history.

(56) References Cited

U.S. PATENT DOCUMENTS

| 4,263,352 | A | * | 4/1981 | Kaltenbach | ............ | C08G 18/58 |
| | | | | | | 427/379 |
| 4,792,357 | A | * | 12/1988 | Bier | ....................... | C09D 5/024 |
| | | | | | | 106/146.51 |
| 5,336,507 | A | | 8/1994 | Na et al. | | |
| 6,255,359 | B1 | | 7/2001 | Agrawal et al. | | |
| 6,436,543 | B1 | | 8/2002 | Endo et al. | | |
| 8,153,233 | B2 | | 4/2012 | Sheng et al. | | |
| 2002/0016250 | A1 | * | 2/2002 | Hayakawa | ............... | C03C 17/23 |
| | | | | | | 502/5 |
| 2003/0105213 | A1 | * | 6/2003 | Hayashi | .................... | C08K 9/02 |
| | | | | | | 524/492 |
| 2005/0277107 | A1 | | 12/2005 | Toner et al. | | |
| 2006/0278158 | A1 | | 12/2006 | Tolbert et al. | | |
| 2008/0026347 | A1 | | 1/2008 | Whitman | | |
| 2008/0177022 | A1 | * | 7/2008 | Yamasaki | ............ | C09D 183/14 |
| | | | | | | 528/31 |
| 2009/0018249 | A1 | * | 1/2009 | Kanagasabapathy | .... | C09D 1/00 |
| | | | | | | 524/434 |
| 2009/0064894 | A1 | * | 3/2009 | Baumgart | ................ | C09D 1/00 |
| | | | | | | 106/18.32 |
| 2012/0021129 | A1 | | 1/2012 | Zhou et al. | | |
| 2012/0058328 | A1 | | 3/2012 | Tourvieille et al. | | |
| 2013/0102726 | A1 | | 4/2013 | Gillard et al. | | |

FOREIGN PATENT DOCUMENTS

| CA | 2437436 | * | 8/2002 |
| CN | 1618893 A | | 5/2005 |
| JP | 2001-179173 | * | 7/2001 |

OTHER PUBLICATIONS

JP 2001-179173 Translation, Jul. 2001.*
"Hydrophilic Paint," Sanmu Nano (Jan. 2013), accessed at http://web.archive.org/web/20130101200446/http://www.nanocaco3.com/market-application/hydrophilic-paint.html, accessed on Aug. 25, 2015, p. 1-1.
"Nano Self Cleaning Paint (hydrophobic or hydrophilic)," China Suppliers, accessed at http://hznano.en.made-in-china.com/product/kehnYqZKyFVM/China-Nano-Self-Clean-Paint-hydrophobic-or-hydrophilic-paint.html, accessed on Apr. 26, 2012, pp. 1-3.
"Surface Tension," Physical Chemical Laboratory, accessed at http://www.tau.ac.il/~phchlab/experiments_new/surface_tenstion/theory.html, accessed on Aug. 25, 2015, pp. 1-6.
Bhushan, B., and Jung, Y.C., "Micro- and nanoscale characterization of hydrophobic and hydrophilic leaf surfaces," Nanotechnology, vol. 17, No. 11, pp. 2758-2772 (May 16, 2006).
Bhushan, B., and Jung, Y.C., "Wetting, adhesion and friction of superhydrophobic and hydrophilic leaves and fabricated micro/nanopatterned surfaces," Journal of Physics: Condensed Matter, vol. 20, No. 22, 225010-1-225010-24 (Apr. 30, 2008).
Burton, Z., and Bhushan, B., "Surface characterization and adhesion and friction properties of hydrophobic leaf surfaces," Ultramicroscopy, vol. 106, Issues 8-9, pp. 709-719 (Jun.-Jul. 2006).
Hurley, T., "Haruna Self Cleaning Paint," (2012) accessed at http://web.archive.org/web/20121012030551/http://cleaning.

(Continued)

*Primary Examiner* — Melvin C Mayes
*Assistant Examiner* — Colette Nguyen

(57) ABSTRACT

Paint configured to provide a hydrophilic paint surface comprising a paint base and a texture imprinting additive (TIA) that provides sacrificial particles upon drying of the paint. Loss of the sacrificial particles increases roughness and reduces the contact angle with water, providing a hydrophilic surface that is wettable and hence self-cleaning. Also described are specific types of TIA, methods of making the paint, methods of making a hydrophilic surface, and kits.

29 Claims, 3 Drawing Sheets

(56) References Cited

OTHER PUBLICATIONS lovetoknow.com/Haruna_Self_Cleaning_Paint, accessed on Aug. 25, 2015, pp. 1-5.
International Search Report and Written Opinion for International Application No. PCT/US2013/039319, dated Aug. 16, 2013.
Wenzel, R.N., "Resistance of Solid Surfaces to Wetting by Water," Industrial & Engineering Chemistry, vol. 28, No. 8, pp. 988-994 (Jan. 1936).

* cited by examiner

COMPOSITION OF HYDROPHILIC PAINTED SURFACE

CROSS REFERENCE TO RELATED APPLICATION

This application is a U.S. National Stage filing under 35 U.S.C. § 371 of International Application No. PCT/US2013/039319, filed on May 2, 2013, which is incorporated herein in its entirety.

BACKGROUND

Durable paint is highly desirable for many reasons, not least because the more durable a paint, the less often a given surface will need to be repainted. Durable paint is typically highly cross-linked, and made mostly from hydrophobic materials. The downside of using such materials to make durable paint is that the resulting painted surface resist wetting, and therefore accumulate pollutants, marks etc, and must be cleaned manually. Manual cleaning adds maintenance costs, which partly counteracts the labor saving benefits of using durable paint in the first place. The present technology describes a hydrophilic painted surface that resists pollutants and, being wettable, can be washed with water, such as rain, mitigating manual washing. As a result, the present technology can combine the benefits of high durability with self cleaning.

SUMMARY

One embodiment of the present technology is a paint, which is configured to provide a hydrophilic painted surface, the paint comprising a paint base and a texture imprinting additive (TIA), wherein the TIA is configured to provide sacrificial particles upon drying of the paint into the painted surface.

The TIA may comprise a water soluble material, an oil soluble material, a photodegradable material, an oxygen-degradable material, a biodegradable polymer, or combinations thereof. Suitable water-soluble solids for the TIA include sugars and organic or inorganic salts. Representative salts may include aluminum salts, ammonium salts, calcium salts, magnesium salts, potassium salts, sodium salts, and barium salts. Example water soluble materials for the TIA include sucrose, hydroxyapatite, magnesium sulfate and hydrate, hydrated calcium sulphate, calcium sulphate, acid ammonium fluoride, ammonium bifluoride, sodium chloride, sodium nitrate, potassium nitrate, sodium carbonate, sodium bicarbonate, sodium acetate, copper phosphate dihydrate, or a combination thereof. In further embodiments, the water-soluble material includes a sulfate, phosphate, dihydrogenphosphate, metal oxide, carbonate, bicarbonate, nitrate, acetate, ammonium, chloride salt, or fluoride salt, or a combination thereof. Suitable biodegradable polymers include a polysaccharide, a polypeptide, polyethylene glycol, polyvinylacetal, polystyrene, a polycarboxylic acid, a polyol, a polyamide, a polyimide, a polyamine, a polyimine, polyglycolic acid, polylactic acid, polyglycolic/polylactic acid copolymers, polyacrylic acid, dextran, poly(methacrylic acid), poly(acrylamide), poly(ethylene imine), cellulose, poly(vinyl alcohol), poly(ethylene oxide), chitosan, or a combination thereof.

The TIA or sacrificial particles formed from TIA may comprise particles of different shapes, including nano-needle, nano-rod, nano-star cluster, or nano-fiber. In some embodiments, more than half of the particles are a specific shape, while in other embodiments the particles are of different combinations of shapes. The TIA or sacrificial particles formed from TIA may have an average particle size of from about 0.001 µm to about 200 µm, from about 0.05 µm to about 5 µm, about 1 nm to about 100 nm, about 1 nm to about 10 nm, or about 6 to about 8 nm.

The paint of the present technology is configured to provide a hydrophilic painted surface upon removal of the TIA. In some embodiments, the hydrophilic painted surface is characterized by a surface roughness of about 0.1 µm to about 2 µm. In some embodiments, the surface roughness is about 0.1 µm, about 0.2 µm, about 0.5 µm, about 0.75 µm, about 1.0 µm, about 1.25 µm, about 1.5 µm, about 1.75 µm, about 2 µm, or ranges between the aforesaid values. In some embodiments, the hydrophilic painted surface is characterized by a water contact angle (θ) from about 0° to about 90°. In some embodiments, the water contact angle (θ) is about 0°, about 15°, about 30°, about 45°, about 60°, about 75°, about 90°, or ranges between the aforesaid values.

In some embodiments, the TIA are suspended particles in the paint base. Such suspended particles may further comprise a surface modifier. The surface modifier may prevent particle-particle interaction, such as by comprising a charged moiety. In other aspects, the TIA is dissolved in a solvent in the paint base such that, upon evaporation of the solvent, solid sacrificial particles of TIA form. Suitable solvents include an aqueous solution, an oil-based solution, an organic solvent-based solution, or a solution based on mineral spirits.

In some embodiments, the paint base is configured to provide a durable painted surface upon drying of the paint. By way of example, such a durable painted surface has properties of abrasion resistance, peeling/blistering resistance, chalking resistance, cracking resistance, erosion resistance, or blistering resistance.

In further embodiments, the paint further comprises a binder such as acrylic, an alkyd, an oil-modified alkyl coating, a phenolic, a phenolic-alkyd, a silicone-alkyd, an epoxy, a moisture-cured (MC) urethane, an oil-modified urethane, a vinyl, or a vinyl-alkyd. Other additives in the paint may include, for example, a pigment, a drying agent, or a vehicle.

The present technology also includes related methods. Accordingly, one embodiment of the present technology is a method of making a paint that is configured to provide a hydrophilic painted surface, the method comprising adding a texture imprinting additive (TIA) to a paint base, wherein upon drying of the paint into a painted surface, the TIA provides sacrificial particles in the dried painted surface, and wherein removal of the sacrificial particles provides the hydrophilic painted surface. Suitable TIAs and their properties are as defined herein.

The present technology also includes a related kit for making a paint which forms a hydrophilic painted surface. The kit may include a texture imprinting additive (TIA), and instructions for adding the TIA to a paint base. Such a kit may further comprise a paint base. In other embodiments, the TIA may be packaged in unit doses.

The present technology also includes a method of making a hydrophilic painted surface, the method comprising: applying to a surface a composition comprising a paint base and a texture imprinting additive (TIA); allowing the composition to dry upon the surface, wherein, upon drying of the composition into a painted surface, the TIA provides sacrificial particles; and removing the sacrificial material to create the hydrophilic painted surface, wherein the hydrophilic painted surface is micro-textured. A suitable microtextured painted surface may have a water contact angle (θ) from about 0° to about 90°, and/or a surface roughness of about 0.1 μm to about 2 μm. In some embodiments, the surface roughness is about 0.1 μm, about 0.2 μm, about 0.5 μm, about 0.75 μm, about 1.0 μm, about 1.25 μm, about 1.5 μm, about 1.75 μm, about 2 μm, or ranges between the aforesaid values. In some embodiments, the water contact angle (θ) is about 0°, about 15°, about 30°, about 45°, about 60°, about 75°, about 90°, or ranges between the aforesaid values.

In such a method, the sacrificial particles may be removed by, for example, washing the painted surface with at least one solvent; exposing the painted surface to photons; exposing the painted surface to an electron beam; washing the painted surface with at least one depolymerizing agent; applying reduced pressure to the painted surface; and heating the painted surface. Suitable depolymerizing agents include an enzyme, an acid, a base, a reducing agent, and an oxidizing agent. Exposing the painted surface to photons may comprise exposing the painted surface to sunlight, ultraviolet light, or infrared light. Other methods of removing the sacrificial material include exposing the painted surface to the exterior environment.

In further embodiments, the composition may be applied over a surface previously coated with a paint base lacking a TIA.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
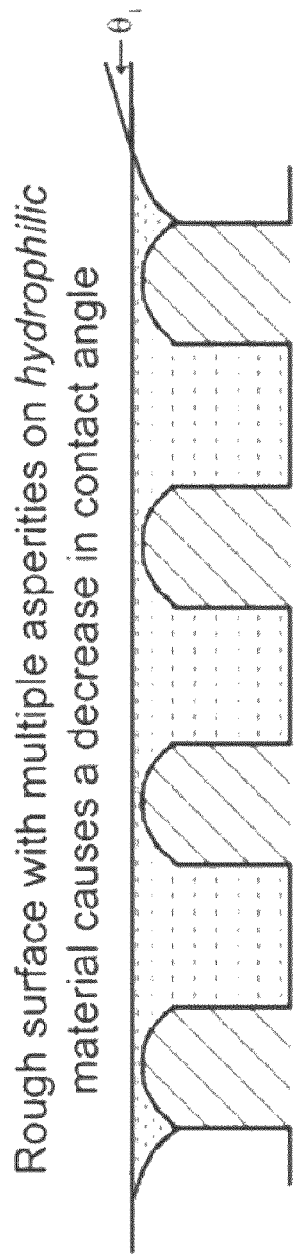
FIG. 1. Illustrates how increasing surface roughness decreases the contact angle (θ°) of the surface with water, and thereby increases hydrophilicity and wettability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The technology is described herein using several definitions, as set forth throughout the specification. For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Disclosed herein are compositions and method related to novel paints. In general, the paints of the present technology include a texture imprinting additive (TIA) which is configured to provide sacrificial particles upon drying of the paint. Exemplary TIAs include a water soluble solid, an oil soluble solid, a photodegradable material, an oxygen-degradable material, a biodegradable polymer, and combinations thereof. A sacrificial particle is one that can be "sacrificed" after the paint dries (i.e., by removing the particle). The loss of the TIA results in a painted surface with increased surface roughness, which leads to increased hydrophilicity. In such a way, the paint compounds disclosed herein form a painted surface that is hydrophilic and thereby resist pollution and is easier to clean.

A "paint" includes any liquid, liquefiable, or mastic composition which, after application to a substrate in a thin layer, is converted to a solid film. It is most commonly used to protect, color or provide texture to objects. Paints may be suspensions of pigments, binders, drying agents, and vehicles.

The "binder," also called the vehicle, is the film-forming component of paint. The binder imparts adhesion and strongly influences such properties as gloss, durability, flexibility, and toughness. Exemplary binder include, but are not limited to, synthetic or natural resins such as alkyds, acrylics, vinyl-acrylics, vinyl acetate/ethylene (VAE), polyurethanes, polyesters, melamine resins, epoxy, or oils.

The "diluent" or "solvent" are used interchangeably and refer to compounds which functions (a) a carrier for the paint base (e.g., a polymer) and (b) to adjust the viscosity, flow and application properties of the paint. The diluent or solvent may be volatile and does not become part of the paint film. For example, water is the main diluent for water-borne paints, even the co-solvent types. Solvent-borne, also called oil-based, paints can have various combinations of organic solvents as the diluent, including aliphatics, aromatics, alcohols, ketones and white spirit. Specific examples are organic solvents such as petroleum. Specific examples are organic solvents such as petroleum distillate, esters, glycol ethers, and the like. Sometimes volatile low-molecular weight synthetic resins also serve as diluents.

"Pigments" are granular solids incorporated in the paint to contribute color. Alternatively, some paints contain dyes instead of or in combination with pigments. Pigments can be classified as either natural or synthetic types. Natural pigments include, without limitation, various clays, calcium carbonate, mica, silicas, and talcs. Synthetic pigments include, without limitation, engineered molecules, calcined clays, blanc fixe, precipitated calcium carbonate, and synthetic pyrogenic silicas.

"Fillers" are a type of pigment that serve to thicken the film, support its structure and increase the volume of the paint. Example fillers include, without limitation, diatomaceous earth, talc, lime, barytes, and clay. Floor paints that will be subjected to abrasion may contain fine quartz sand as fillers. Not all paints include fillers. On the other hand, some paints contain large proportions of pigment/filler and binder.

In addition to above described ingredients, the paint of the present technology may also include a variety of miscellaneous additives. The additives may serve purposes including, without limitation, modifying surface tension, improving flow properties, improving the finished appearance, increasing wet edge, improving pigment stability, imparting antifreeze properties, controlling foaming, controlling skinning, or a combination thereof. Other types of example additives useful to the present technology may include, without limitation, catalysts, thickeners, stabilizers, emulsifiers, texturizers, adhesion promoters, UV stabilizers, flatteners (de-glossing agents), biocides to fight bacterial growth, and the like.

The addition of a TIA imparts novel and useful properties to the paint.

There is a variety of paints that are adapted for different purposes. A desirable property of paint, especially exterior paints, is durability. A "durable paint" as used herein refers to a paint that, upon forming a painted surface, has the ability to retain a continuous coating after exposure to normal stressors for which the paint is designed. Durability is an assurance or probability that the paint will have a relatively long continuous useful life, without requiring an inordinate degree of maintenance.

Most durable paints, such as those used in exteriors, are made from hydrophobic materials. Such hydrophobic materials repel water, meaning that water such as rain beads on the surface, and does not fully wet the surface and therefore is insufficient to wash away exterior contaminants. The present technology provides paints that are capable of providing hydrophilic painted surface while preserving the durability of the painted surface. This is achieved by adding texture imprinting additives that alter the microstructure of the painted surface.

To increase the hydrophilicity of a painted surface, a paint is modified to incorporate a texture imprinting additive that provides sacrificial particles upon drying of the paint into a painted surface. Unlike microscopic dust particles, the sacrificial particles from TIA may be particles having predefined shape and/or size. TIA may be sacrificial particles suspended in a paint emulsion. Alternatively, sacrificial particles may be formed from TIA when the painted surface is dried. In one embodiment, the TIA may be water-soluble in a paint composition. When the paint composition is applied to a surface, the solvent evaporates leaving paint film with sacrificial particles formed from TIA trapped on the surface of the paint film. After drying, the sacrificial particles from TIA may be removed. For example, if the sacrificial particle from TIA is water soluble, when the painted surface is exposed to water, such as in a rainy environment, the rainwater will wash away the sacrificial particles on the painted surface and leave behind a microtextured paint surface with increased hydrophilicity.

The TIA can be adapted to different types of paints, according to mechanisms of drying/curing, and therefore the paint formulations and the TIA can be adjusted to optimize the painted surface performance. For example, paints that dry by solvent evaporation may contain the TIA either as insoluble particles in the solvent or as forming particles upon evaporation of the solvent.

In one embodiment, the TIA may be a compound that is soluble in the paint solvent. When the paint is applied to a surface, the TIA crystallizes or precipitates to provide sacrificial particles as the solvent evaporates. The crystallization or precipitation process results in the trapping of the sacrificial particles from TIA on the painted surface. The sacrificial particles of TIA may have desired shape or sizes by selecting the conditions including, without limitation, the types of the solvent, the type of TIA, and the concentration of TIA.

In one example, a water-soluble salt may be used as a TIA for a water-based paint (i.e., where water or an aqueous solution is the solvent). For example, the water-based paint may be a latex paint. The latex paint may be a water-borne dispersion of sub-micrometer polymer particles such as acrylic, vinyl acrylic (PVA), styrene acrylic, etc. as binders. In the latex paint, the TIA may be dissolved in the aqueous solvent vehicle and form sacrificial particles upon drying of the paint into a painted surface. The sacrificial particles may be removed by washing the painted surface with water without removal of the paint. Various known inorganic salts are known to be water-soluble and can crystallize into different shapes and sizes, such as needle like, star like, or rod like nanosize crystals when water evaporates. Such salts include, but not limited to, hydroxyapatite (HA), magnesium sulfate hydrate, hydrated calcium sulphate, acid ammonium fluoride, ammonium bifluoride, etc.

For paints that cure by an active step (e.g., oxidative curing, UV curing), the TIA may be selected so that it does not affect the curing step. The TIA can be a dissolved in the paint and may form sacrificial particles upon drying of the paint. Because the surface of the drying paint dries before deeper layers, sacrificial particles form preferentially at the surface of the paint.

In one example, TIA crystals may be suspended in an oil-based or other organic solvent-based paint because the crystals may have limited solubility in the oil or organic solvent. When such a paint composition is applied to a surface, the organic solvent evaporates and the salt crystals become trapped in the painted surface. Applying water to the painted surface will remove the water-soluble sacrificial crystals, which results in a microtextured paint surface with increased hydrophilicity.

TIAs useful in the present technology are not limited to water soluble TIAs and may be other stimuli sensitive materials. For example, UV-sensitive sacrificial particles from TIA may be degrade at the painted surface to form a microstructure. In some embodiments, UV-sensitive sacrificial particles from TIA may degrade at the surface, and may be comparatively unaffected in deeper layers.

Some sacrificial particles from TIA may be removed (i.e., sacrificed) from paint surfaces through passive means. For example, exposure of the painted surface to the environment (e.g., water, UV, air) results in removal of the sacrificial particles from TIA.

Some sacrificial particles from TIA may require an active step to remove. In one example, if the TIA is an enzyme-sensitive organic molecule, the sacrificial particles from TIA may be removed from the painted surface by wash the painted surface with a solvent containing the enzyme. In another example, sacrificial particles from UV sensitive TIA may be passively removed on an exterior surface, but on an interior surface, an application of a UV light source may be used to remove the sacrificial particles.

The paint in the present technology may be implemented by using known and commercially available materials. Any additional steps need for TIA removal may be carried out using equipment or setups already in place for a painting project. For example, painting is typically performed with various machinery, scaffolding, covers etc, which can remain in place while the paint cures, and is present for the subsequent removal of the TIA. The resulting surface is then hydrophilic and self-cleaning.

The hydrophilic painted surface being easily and readily washed, is not only more esthetically pleasing but it is surprisingly also more durable because the painted surface does not accumulated pollutants.

Without being bound by theory, it is believed that removal of the sacrificial particles of TIA from a painted surface provides a hydrophilic painted surface works because, upon loss of the TIA from the painted surface, the remaining painted surface has a texture with enhanced wetting.

Wetting is characterized by the contact angle of a surface. The hydrophilic property of wetting occurs when the surfaces has a contact angle of θ<90°. The contact angle depends on several factors, such as roughness, the manner of surface preparation, and surface cleanliness.

Models have been presented in the past to determine how roughness affects hydrophobicity. Wenzel (1936) developed the first model, which is based on the consideration of net energy decrease during spreading of a droplet on a rough surface. A rough surface has larger solid-liquid interface area, leading to larger net energy, and it is responsible for the increase of contact angle for a hydrophobic surface and the decrease of the contact angle for a hydrophilic surface. Wenzel developed an equation that relates the roughness with the contact angles of a flat surface of a certain material and that of the rough surface of the same material. Wenzel's equation is given by:

$$\cos\theta = R_f \cos\theta°$$

where θ=contact angle of a rough surface, θ°=contact angle of a flat surface, and $R_f$=roughness factor of the rough surface. The roughness factor is defined as the ratio of the total surface area of the rough surface and the projected area of the rough surface or the footprint of the total surface area.

This model predicts that for a surface to become more hydrophobic by introducing roughness, θ° must be greater than 90°. If θ° is less than 90° then the contact angle for the rough surface will decrease with increasing $R_f$. Therefore, for a hydrophilic surface, increasing roughness of the surface will further increase the hydrophilicity of the surface, as shown in FIG. 1.

Figure 2:
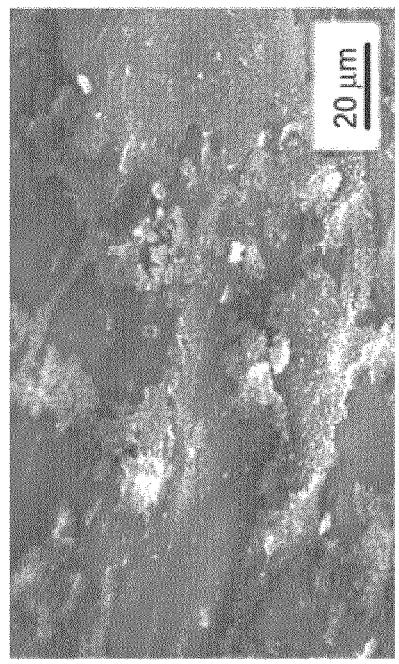
FIG. 2. The microstructures of hydrophilic surfaces of *fagus sylvatica* (left) and *magnolia grandiflora* (right) leaves.
Figure 2:
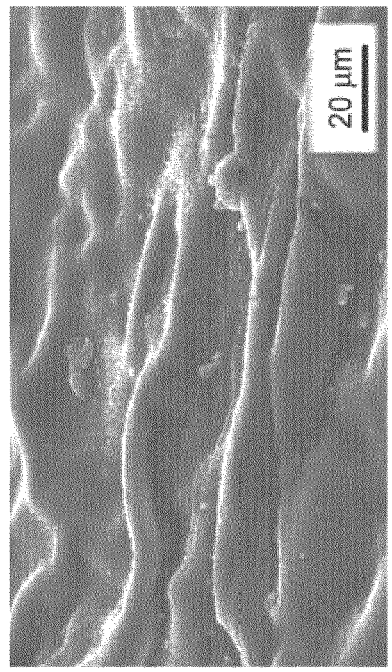

The same phenomenon has been observed in nature. For example, hydrophilic leaves, such as *Fagus sylvatica* and *Magnolia grandiflora*, have rather flat tabular cells with a 2-D thin wax film (not continuous) on the surface (FIG. 2). These trench-like microstructures on the surface make the leave surface hydrophilic.

Figure 3:
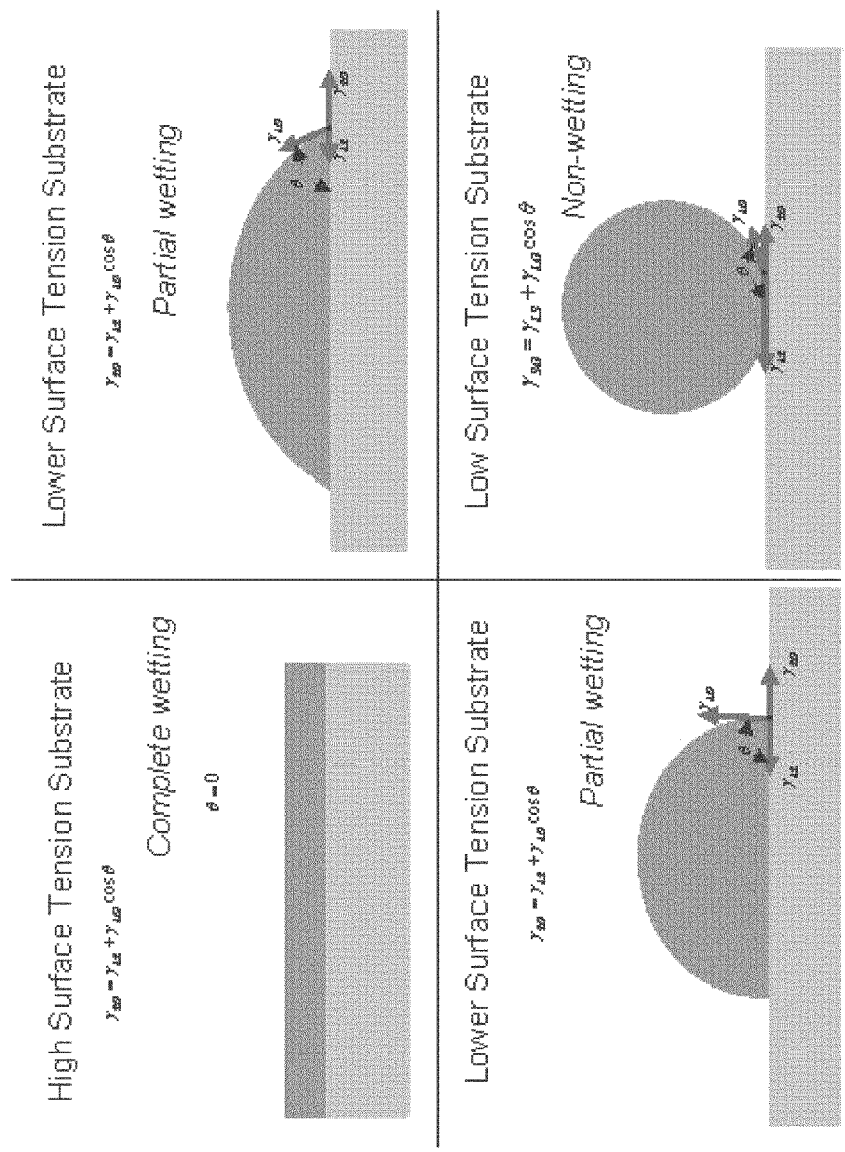
FIG. 3. Illustration of wetting, the contact angle (θ), and the surface tension (γ) between different phases.

Most processes that involve liquids deal with situations where the free surface of the liquid meets a solid boundary, thus forming the so-called three-phase-contact line—solid-liquid-gas. The contact line can move along the solid surface, leading to "wetting" or "dewetting". The interaction between a liquid and a solid involves three interfaces; the solid-liquid interface, the liquid-vapor interface and the solid-vapor interface. Each of these interfaces has an associated surface tension, γ, which represents the energy required to create a unit area of that particular interface. A different approach is to regard γ as a force acting on the drop. This approach is shown in FIG. 3, where γ appears as an arrow. At equilibrium, force equilibrium along the X axis provides a relation between the angle, θ, and the surface tensions of the three interfaces. This is called Young's equation:

$$\gamma_{SG} = \gamma_{SL} + \gamma_{LG}\cos(\theta)$$

Where $\gamma_{SG}$, $\gamma_{SL}$ and $\gamma_{LG}$ are the surface tensions of interfaces solid/gas, solid/liquid and liquid/gas respectively. θ is the angle between a liquid drop and a solid surface, called the contact angle.

The magnitude of Young's contact angle is the result of energy minimization. If the liquid-gas surface tension is smaller than the solid-gas surface tension ($\gamma_{LG} < \gamma_{SG}$), the liquid-solid interface will increase to minimize energy. As the drop wets the surface, the contact angle approaches zero, leading to complete wetting. Other ratios of $\gamma_{LG}$ and $\gamma_{SG}$ will lead to the formation of drops of different shapes as shown in FIG. 3. A hydrophilic surface is defined as a surface where 0°<θ<90°, and hydrophobic surface is a surface where θ≥90°.

Accordingly, by increasing the surface roughness, the painted surface becomes hydrophilic and therefore wettable.

To prepare the painted surface according to the present technology, the surface to be painted is typically cleaned first, so as to ensure that the paint adheres directly to the solid surface, which may affect adhesion, durability, and the appearance of the resulting painted surface. Surfaces may also prepared by coating with a primer. Priming ensures better adhesion of paint to the surface, increases paint durability, and provides additional protection for the material being painted. Primer can also be used to block and seal stains, or to hide a color that is to be painted over.

The paint may be applied according to methods known in the art, or modified to account for the presence of the TIA, as set forth below.

Liquid paint may be directly applied to a surface using brushes, paint rollers, blades, other instruments, or body parts such as fingers and thumbs. After liquid paint is applied, there is an interval during which it can be blended with additional painted regions (at the "wet edge") called "open time." The open time of an oil or alkyd-based emulsion paint can be extended by adding white spirit, similar glycols such as propylene glycol ether or open time prolongers. This can also facilitate the mixing of different wet paint layers for aesthetic effect. Latex and acrylic emulsions require the use of drying retardants suitable for water-based coatings. In the present technology, a TIA suitable for use in a liquid paint may be a solid in the paint, or dissolved in the paint.

For spray painting, the paint is suspended in solid or liquid form in a gas that is sprayed on an object. The paint sticks to the object. A chemical (typically a solvent) can be sprayed along with the paint to dissolve together both the delivered paint and the chemicals on the surface of the object being painted. In the present technology, the TIA may be added directly to the paint and sprayed. In another embodiment, the TIA may be applied after applying the paint.

If the paint is a solid paint (usually used in industrial and automotive applications), it is sprayed on as a very fine powder, then baked at high temperature. This melts the powder and causes it to adhere to the surface. The reasons for doing this involve the chemistries of the paint, the surface itself, and perhaps even the chemistry of the substrate (the object being painted). This is called "powder coating." Here, the TIA may be added directly to the solid paint and or added later. For example, a TIA (e.g., a salt) that consists of particles with a melting point above that of the paint powder is applied, and the painted object heated to a temperature that melts the solid paint and adheres it to the surface, but does not melt the TIA.

Paint application by spray is the most popular method in industry. Typically, the paint is atomized by the force of compressed air or by the action of high pressure compression of the paint itself, and the paint is turned into small droplets which travel to the article which is to be painted. Alternate methods are airless spray, hot spray, hot airless spray, and any of these with an electrostatic spray included. There are numerous electrostatic methods available. The TIA can be chosen such that it does not interfere with the flow of the charged particles that occurs during electrostatic spray methods.

Dipping used to be the norm for objects such as filing cabinets, but this has been replaced by high speed air turbine driven bells with electrostatic spray. Car bodies are primed using cathodic electrophoretic primer, which is applied by charging the body depositing a layer of primer. The unchanged residue is rinsed off and the primer stoved.

Following application of the paint to form a painted surface, it remains to remove the TIA to create a hydrophilic painted surface. If the TIA is water-soluble, it may be removed by washing with an aqueous solvent. For example, in an exterior paint exposed to the weather, rainwater will wash away the nanoparticles on the painted surface and leave behind a microtextured paint surface with increased hydrophilicity. Such salts include, but not limited to, hydroxyapatite (HA), magnesium sulfate hydrate, hydrated calcium sulphate, acid ammonium fluoride, ammonium bifluoride, etc.

The TIA may be removed by other methods that depend on the properties of the TIA. For example, a UV-sensitive TIA would degrade at the painted surface to form a microstructure, but would be comparatively unaffected in deeper layers. Such a TIA could be removed either through exposure to natural ultraviolet let from the sun, or could be specifically treated with, e.g., a UV lamp.

The resulting hydrophilic painted surface may be highly durable. Durability is an assurance or probability that the paint will have a relatively long continuous useful life, without requiring an inordinate degree of maintenance.

In assessing durability, it is helpful to understand the types of failures that may occur in a painted surface. Common painted surface failure includes, without limitation, cracking, chalking, erosion, and blistering. Cracking of paint film may due to the unequal expansion or contraction of paint coats. The degree of cracking can be assessed according to International Standard ISO 4628 Part 4 or ASTM Method D661 (Standard Test Method for Evaluating Degree of Cracking of Exterior Paints).

Chalking is the progressive powdering of the paint film on the painted surface. The primary reason for the problem is polymer degradation of the paint matrix due to exposure of UV radiation in sunshine and condensation from dew. The degree of chalking varies as epoxies react quickly while acrylics and polyurethanes can remain unchanged for long periods. The degree of chalking can be assessed according to International Standard ISO 4628 Part 6 or 7 or American Society of Testing and Materials (ASTM) Method D4214 (Standard Test Methods for Evaluating the Degree of Chalking of Exterior Paint Films). Erosion is very quick chalking. It occurs due to external agents like air, water etc. It can be evaluated using ASTM Method ASTM D662 (Standard Test Method for Evaluating Degree of Erosion of Exterior Paints). Blistering is due to improper surface exposure of paint to strong sunshine. The degree of blistering can be assessed according to ISO 4628 Part 2 or ASTM Method D714 (Standard Test Method for Evaluating Degree of Blistering of Paints).

Accordingly, the person of ordinary skill can measure failure and defects in paint following established standards. The failure of paint over time varies according to the type of paint, and the environment stressors to which it is exposed. Therefore, durability is a relative term that varies according to multiple factors, but most succinctly may be defined as the period of time required between the initial painting and any follow up. The paint of the present invention form a hydrophilic painted surface that is durable, and may be advantageously more durable than a regular painted surface because the self-cleaning nature of the paint mitigates the detrimental effects of pollution, and reduces the requirement for active cleaning with accompanying mechanical and chemical stressors.

The hydrophilic painted surface is particularly advantageous in regards to cleaning Any painted surface typically requires cleaning. Cleaning is necessary to preserve the aesthetic properties of the surface and to prevent the painted surface from acting as a source of stains etc for others coming in contact with the painted surface. Failure to clean a paint surface may lead to the surface contaminants staining the surface. Cleaning is also necessary to preserve the protective functions of paint. For example, many paints are able to "breathe" and thus water may pass through, albeit at a greatly reduced rate compared to the unpainted surface. Such properties are necessary to prevent moisture accumulation underneath the paint. Because such paints only retard, but are not an absolute barrier prevent, pollutants may gradually penetrate the paint into the underlying structure. Other examples are that, pollutants that darken surface of the paint increase the absorption of radiant heat, which increases heat transfer to the underlying structure.

Cleaning may also be necessary to preserve the durability and integrity of the painted surface. For example, pollutants that darken surface of the paint and increase absorption of heat by the paint will typically be expected to accelerate thermal decomposition of the binder. Pollutants on a surface may also chemically react with the paint, leading to failure. Over time, pollutants may be converted to species (e.g., through exposure to solar radiation and oxygen) that are more reactive with the binder.

The present hydrophilic painted surface may be more readily washable and may be self-cleaning in that exposure to rain will result in the removal of contaminants more effectively than a conventional painted surface. Being more washable also results in the advantage that the hydrophilic surface can be cleaned with water without detergents, or with lower concentrations of detergent, than conventional painted surface.

Exemplary Paints

The present invention is applicable to a wide variety of paints. In exemplary embodiments, the TIA is matched to the specific type of paint.

TABLE 2

Comparison of characteristics of the more common binders.

|  | Abrasion resistance | Water resistance | Acid resistance | Hardness | Adhesion | Flexibility |
| --- | --- | --- | --- | --- | --- | --- |
| Alkyds | 2 | 3 | 3 | 2 | 2 | 2 |
| Epoxy | 1 | 2 | 2 | 1 | 1 | 1 |
| Phenolic | 1 | 1 | 1 | 1 | 2 | 2 |
| Latex | 2 | 3 | 2 | 2 | 2 | 1 |
| MC urethane | 1 | 1 | 1 | 1 | 1 | 1 |

Ranking: 1 = Excellent, 2 = Good, 3 = Fair, 4 = Poor.

For example, acrylic paints utilize a water-based system but dry through a chemical coalescence, and become resistant to water. As such, a wide variety of TIA can be used in acrylic paints.

Other highly durable oil-based paints include oil-modified alkyd coatings are typically inexpensive, and have excellent color retention, durability, and flexibility, and fair chemical resistance, drying speed, and sea-spray resistance. Phenolic paints have high abrasion, water, and chemical resistance and are excellent for top coating structures in extremely wet environments. Combining phenolic and alkyd binders typically results in a paint with the resistance properties of the phenolics and the color retention of the alkyds. Because these paints are oil based, a water soluble TIA can be suspended in the paint and, upon drying of the painted surface, the TIA may be removed through washing with an aqueous solvent.

Epoxy coatings can be used on almost any surface. Dry epoxy films have remarkable hardness, adhesion and flexibility. They are also characterized by excellent resistances to abrasion, solvents resistance, and corrosion. As a result, an epoxy paint could incorporate a wide variety of TIA that can be removed through more aggressive methods that would not be tolerated by less durable paints. For example, washing with a high pressure hose would rapidly remove the TIA but not damage the painted surface.

EXAMPLES

Example 1

An exterior building surface is cleaned, primed and painted with an oil-based acrylic paint. After the paint dries, a second coat is applied. The second coat contains a percentage of nano-sized crystals of sodium chloride. Upon drying of the second coat, the crystals of sodium chloride are distributed evenly over the painted surface.

The painted surface is exposed to rain which removes the sodium chloride crystals, leaving a microtextured surface. The resulting microtextured surface is hydrophilic such that subsequent exposure to rain results in wetting of the painted surface and removal of pollutants.

EQUIVALENTS

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A paint that is applied to a surface to provide a hydrophilic painted surface, the paint comprising:
   a paint base that includes a solvent; and
   a texture imprinting additive (TIA) comprises particles that are suspended in the solvent of the paint base;
   wherein the TIA comprises one or more of a water soluble solid, a photodegrading material, an oxygen-degrading material, or a combination thereof,
   wherein one or more of the water soluble solid comprises at least one of a sugar, an organic salt, an inorganic salt, or a combination thereof,
   wherein the solvent of the paint base evaporates leaving behind sacrificial particles of the TIA on the painted surface;
   wherein the sacrificial particles of the TIA have an average particle size in a range from about 0.001 µm to about 200 µm;
   wherein removal of the sacrificial particles of the TIA leaves behind a microtextured surface with increased hydrophilicity upon drying of the painted surface; and
   wherein the microtextured surface with increased hydrophilicity has a surface roughness in a range from about 0.1 µm to about 2 µm.

2. The paint of claim 1, wherein one or more of the water-soluble solid is selected from a group consisting of a sucrose, a hydroxyapatite, a magnesium sulfate hydrate, a hydrated calcium sulphate, an acid ammonium fluoride, an ammonium bifluoride, a sodium chloride, a sodium nitrate, a potassium nitrate, a sodium carbonate, a sodium bicarbonate, a sodium acetate, a copper phosphate dihydrate, and a combination thereof.

3. The paint of claim 1, wherein one or more of the water-soluble solid is selected from a group consisting of a sulfate, a phosphate, a metal oxide, a carbonate, a bicarbonate, a nitrate, an acetate, an ammonium, a fluoride salt, and a combination thereof.

4. The paint of claim 1, wherein the TIA comprises particles with a shape corresponding to one or more of a nano-needle, a nano-rod, a nano-star cluster, or a nano-fiber.

5. The paint of claim 1, wherein the sacrificial particles of the TIA have the average particle size in a range from about 0.05 µm to about 5 µm.

6. The paint of claim 1, wherein the sacrificial particles of the TIA have the average particle size in a range from about 6 nm to about 8 nm.

7. The paint of claim 1, wherein microtextured surface with increased hydrophilicity has a water contact angle (θ) in a range from about 0° to about 90°.

8. The paint of claim 1, wherein the suspended particles further comprise a surface modifier.

9. The paint of claim 8, wherein the surface modifier prevents particle-particle interaction.

10. The paint of claim 9, wherein the surface modifier comprises a charged moiety.

11. The paint of claim 1, wherein the paint base comprises an aqueous solution.

12. The paint of claim 1, wherein the paint base comprises an oil-based solution or a solution based on mineral spirits.

13. The paint of claim 1, wherein the paint base is a durable paint.

14. The paint of claim 13, wherein the durable paint comprises a hydrophobic material.

15. The paint of claim 1, further comprising a pigment.

16. The paint of claim 1, further comprising a binder selected from a group consisting of an acrylic, an alkyd, an oil-modified alkyl coating, a phenolic, a phenolic-alkyd, a silicone-alkyd, an epoxy, a moisture-Cured (MC) Urethanes, an Oil-Modified Urethanes, a Vinyl, and a Vinyl-Alkyd.

17. The paint of claim 1, further comprising a drying agent.

18. A method of making a paint, the method comprising: mixing a texture imprinting additive (TIA) with a paint base; wherein the TIA comprises one or more of a water soluble solid, a photodegrading material, an oxygen-degrading material, or a combinations thereof, wherein one or more of the water soluble solid comprises at least one of a sugar, an organic salt, an inorganic salt, and a combination thereof, and wherein the TIA has an average particle size in a range from about 0.001 µm to about 200 µm; wherein when the paint is applied to a surface and the TIA removed, the surface has a microtextured surface with increased hydrophilicity and has a surface roughness in a range from about 0.1 µm to about 2 µm.

19. The method of claim 18, wherein mixing the TIA with the paint base comprises mixing one or more of a water-soluble solid TIA with the paint base, wherein one or more of the water-soluble solid TIA is selected from a group consisting of a sucrose, a hydroxyapatite, a magnesium sulfate hydrate, a hydrated calcium sulphate, an acid ammonium fluoride, an ammonium bifluoride, a sodium chloride, a sodium nitrate, a potassium nitrate, a sodium carbonate, a sodium bicarbonate, a sodium acetate, a copper phosphate dihydrate, and a combination thereof.

20. The method of claim 18, wherein mixing the TIA with the paint base comprises mixing one or more of a water-soluble solid TIA with the paint base, wherein one or more of the water-soluble solid TIA is selected from a group consisting of a sulfate, a phosphate, a metal oxide, a carbonate, a bicarbonate, a nitrate, an acetate, an ammonium, a fluoride salt, and a combination thereof.

21. The method of claim 18, wherein mixing the TIA with the paint base comprises mixing TIA particles with the paint base, wherein the TIA particles have a shape corresponding to one or more of a nano-needle, a nano-rod, a nano-star cluster, or a nano-fiber.

22. The method of claim 18, further comprising:
applying a paint mixture to a surface to form a painted surface; and
after the paint is dried, removing the TIA from the painted surface.

23. A method of making a surface hydrophilic, the method comprising:
applying a composition to the surface, wherein the composition comprises a paint base and a texture imprinting additive (TIA),
wherein the TIA comprises one or more of a water soluble solid, a photodegrading material, an oxygen-degrading material, or a combination thereof,
wherein one or more of the water soluble solid comprises at least one of a sugar, an organic salt, an inorganic salt, or a combination thereof, and
wherein the TIA has an average particle size in a range from about 0.001 µm to about 200 µm;
facilitating drying of the composition on the surface to form a painted surface, wherein the TIA provides sacrificial particles on the painted surface; and
removing the sacrificial particles from the painted surface to form a hydrophilic painted surface, wherein the hydrophilic painted surface is microtextured and,
wherein the microtextured surface with increased hydrophilicity has a surface roughness in a range from about 0.1 µm to about 2 µm.

24. The method of claim 23, wherein removing the sacrificial particles from the painted surface provides the painted surface with a water contact angle (θ) in a range from about 0° to about 90°.

25. The method of claim 23, wherein removing the sacrificial particles from the painted surface comprises one or more of the following:
washing the painted surface with at least one solvent;
exposing the painted surface to photons;
exposing the painted surface to an electron beam;
washing the painted surface with at least one depolymerizing agent; and
heating the painted surface.

26. The method of claim 23, wherein removing the sacrificial particles from the painted surface comprises washing the painted surface with at least one depolymerizing agent selected from a group consisting of an enzyme, an acid, a base, a reducing agent, and an oxidizing agent.

27. The method of claim 23, wherein removing the sacrificial particles from the painted surface comprises exposing the painted surface to an exterior environment.

28. The method of claim 23, wherein the surface is previously coated with the paint base lacking the TIA.

29. The method of claim 23, wherein removing the sacrificial particles from the painted surface comprises exposing the painted surface to photons from one or more of sunlight, ultraviolet light, or infrared light.

* * * * *